US012764089B2

(12) United States Patent
Lee

(10) Patent No.: US 12,764,089 B2
(45) **Date of Patent: *Oct. 13, 2026**

(54) ADDRESS TRANSLATION

(71) Applicant: Comcast Cable Communications, LLC, Philadelphia, PA (US)

(72) Inventor: Yiu Leung Lee, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/337,846

(22) Filed: Jun. 20, 2023

(65) Prior Publication Data

US 2023/0336642 A1 Oct. 19, 2023

Related U.S. Application Data

(63) Continuation of application No. 17/230,432, filed on Apr. 14, 2021, now Pat. No. 11,736,593, which is a continuation of application No. 15/426,542, filed on Feb. 7, 2017, now Pat. No. 11,019,181, which is a continuation of application No. 14/634,187, filed on Feb. 27, 2015, now Pat. No. 9,602,633, which is a continuation of application No. 13/353,439, filed on Jan. 19, 2012, now Pat. No. 9,014,189.

(51) Int. Cl.

| | |
|---|---|
| ***H04L 61/251*** | (2022.01) |
| ***H04L 69/08*** | (2022.01) |

(52) U.S. Cl.

CPC ............ *H04L 61/251* (2013.01); *H04L 69/08* (2013.01)

(58) Field of Classification Search

CPC .............................. H04L 69/08; H04L 61/256

See application file for complete search history.

(56) References Cited

U.S. PATENT DOCUMENTS

| | | | |
|---|---|---|---|
| 2004/0190549 | A1 | 9/2004 | Huitema |
| 2005/0249213 | A1 | 11/2005 | Tiguchi et al. |
| 2006/0045129 | A1 | 3/2006 | Hart et al. |
| 2006/0209885 | A1 | 9/2006 | Hain et al. |
| 2010/0008260 | A1 | 1/2010 | Kim et al. |
| 2010/0017833 | A1 | 1/2010 | Abramson et al. |
| 2010/0063988 | A1 | 3/2010 | Khalid et al. |
| 2010/0080240 | A1 | 4/2010 | Corbel |
| 2010/0157963 | A1 | 6/2010 | Choi et al. |

(Continued)

FOREIGN PATENT DOCUMENTS

EP 2658168 A1 * 10/2013 ............ H04L 45/42

OTHER PUBLICATIONS

Q. Wang et al., "Multicast Extensions to DS-Lite in Broadband Deployments draft-qin-softwire-dslite-multicast-01", Internet Engineering Task Force, Oct. 25, 2010.

(Continued)

*Primary Examiner* — Sujoy K Kundu
*Assistant Examiner* — Raul Rivas
(74) *Attorney, Agent, or Firm* — Banner & Witcoff, Ltd.

(57) ABSTRACT

An apparatus, method, system and computer-readable medium are provided for converting traffic of a first communication type to traffic of one or more additional communication types. Multicast communications may be supported. One or more communication paths may be established to support transmitting data to one or more client devices in the multicast group.

17 Claims, 4 Drawing Sheets

(56) References Cited

U.S. PATENT DOCUMENTS

| | | | |
|---|---|---|---|
| 2011/0107379 | A1 | 5/2011 | Lajoie et al. |
| 2011/0110286 | A1 | 5/2011 | Lu et al. |
| 2012/0076062 | A1 | 3/2012 | Breitbach et al. |
| 2012/0178415 | A1 | 7/2012 | Ch'Ng et al. |
| 2022/0150934 | A1 | 5/2022 | Freda et al. |

OTHER PUBLICATIONS

Q. Wang et al., "Multicast Extensions to DS-Lite in Broadband Deployments draft-qin-softwire-dslite-multicast-03", Softwire WG, Mar. 14, 2011.

* cited by examiner

ADDRESS TRANSLATION

CROSS REFERENCE TO RELATED APPLICATIONS

This application is a continuation of U.S. application Ser. No. 17/230,432, filed Apr. 14, 2021, which is a continuation of Ser. No. 15/426,542, filed Feb. 7, 2017 (now U.S. Pat. No. 11,019,181), which is a continuation of U.S. application Ser. No. 14/634,187, filed Feb. 27, 2015 (now U.S. Pat. No. 9,602,633), which is a continuation of U.S. application Ser. No. 13/353,439, filed Jan. 19, 2012 (now U.S. Pat. No. 9,014,189), each of which is incorporated in its entirety by reference herein.

BACKGROUND

Communications between two or more devices may be implemented or facilitated via the use of addresses. For example, IPv4 communications support thirty-two (32) bit addresses. Due to the growth and expansion of communication networks, and more particularly, the number of devices that now communicate over networks like the Internet, additional communication protocols have been introduced and utilized. For example, IPv6 utilizes one hundred twenty eight (128) bit addresses, thereby expanding the number of available addresses.

Transitioning communications from a first type (e.g., a first version of a protocol) to a second type (e.g., a second version of a protocol), such as transitioning from IPv4 to IPv6 communications, may be cumbersome. For example, some new or legacy devices, such as legacy hosts, routers, and user devices might not be configured to support IPv6 communications. Given the extent and prevalence of such devices, device makers and network and service providers may be reluctant to incur the costs associated with the transition. Such reluctance may delay the advancement and progress of IPV6 compliant communications. Moreover, even assuming that device makers and network or service providers might otherwise be inclined to transition to IPv6 communications, the providers might not have access or control over such communications, devices, or equipment, thereby potentially requiring the providers to continue to support IPv4 communications during a transition to IPv6 communications. The foregoing shortcomings are identified by this disclosure, and address below.

SUMMARY

This summary is not intended to identify critical or essential features of the disclosure provided herein, but instead merely summarizes certain features and variations thereof.

In some embodiments, a device may operate as a proxy for converting data traffic according to a first communication type (e.g., IPv4 data packets) into traffic according to a second communication type (e.g., IPv6 data packets), and vice versa. In some embodiments, the device may serve as an interface between two or more other devices or communication networks, where the two or more communication networks may adhere to different communication types, protocols, standards, etc.

In some embodiments, a device may receive one or more messages from a client device. The one or more received messages may be indicative of a request for service. The one or more received messages may be indicative of, or be interpreted as, a request to be enrolled in one or more service groups.

In some embodiments, a device may receive data intended for one or more destinations. The data received at the device may adhere to a first communication type. The one or more destinations may comprise one or more user or client devices. In some embodiments, the device may maintain a table to facilitate forwarding or transmitting the data as part of a tunnel or channel (e.g., a multicast tunnel or channel). The table may map a destination address to one or more tunnel interfaces. In some embodiments, the device may transmit or forward the received data to one or more destination addresses using one or more tunnels. In some embodiments, the transmitted or forwarded data may be directed to the destination addresses using a second communication type.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Various connections between elements are discussed in the following description. These connections are general and, unless specified otherwise, may be for example direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
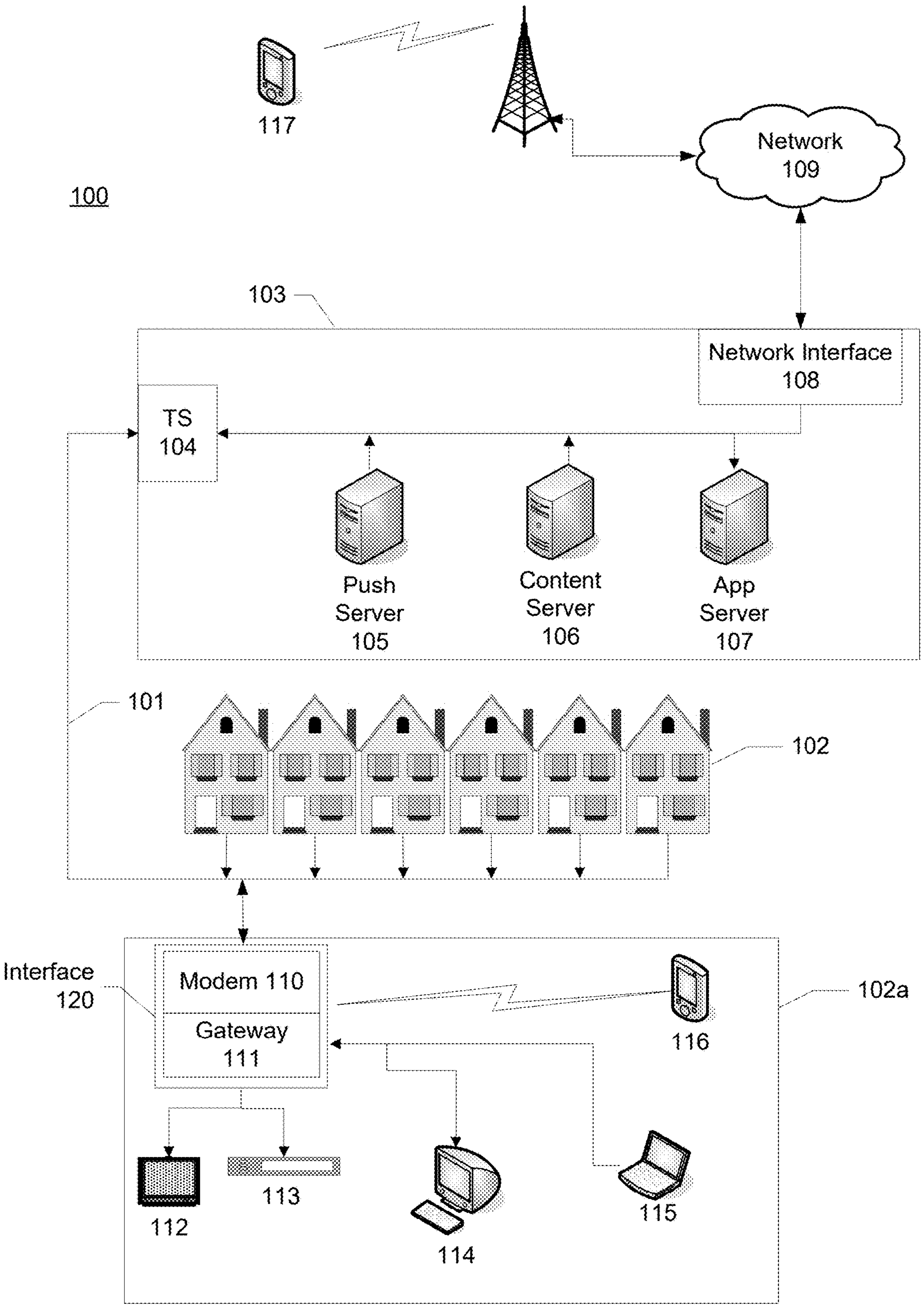
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a termination system (TS) 104, such as a cable modem termination system (CMTS), which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications) . The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises 102*a* may include an interface 120. The interface 120 may comprise, in one aspect, a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the premises 102*a* to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the premises 102*a*, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. In some embodiments, a client device 117 may communication with central office 103 via one or more communication interfaces, such as network interface 108 and network 109.

Figure 2:
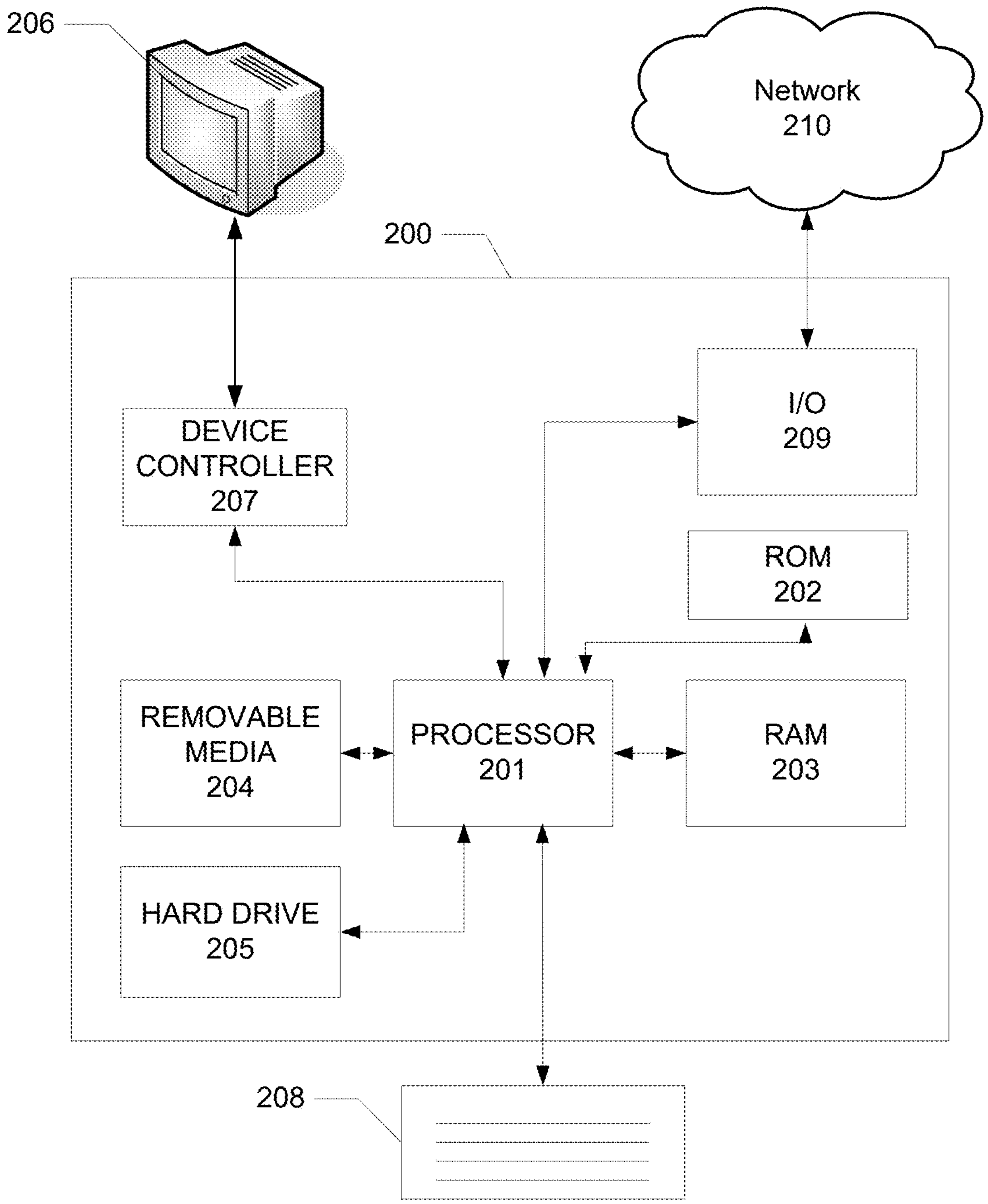
FIG. 2 illustrates an example computing device on which the various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Aspects of this disclosure may be implemented to interface communications between two or more network or communications systems. In some embodiments, an exchange of messages and/or data may be used to facilitate the communications. In some embodiments, an address associated with one or more client devices may be obtained to associate the client device(s) with one or more tunnels.

Figure 3:
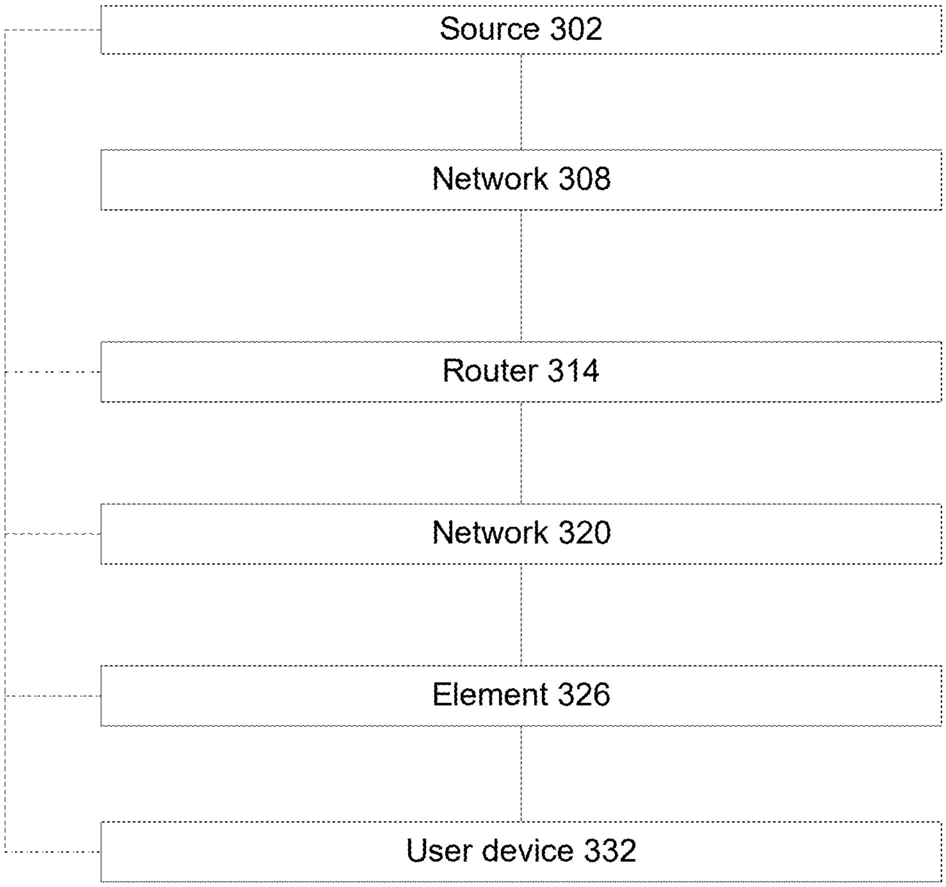
FIG. 3 illustrates an architecture demonstrating one or more aspects of this disclosure.

FIG. 3 illustrates an architecture demonstrating one or more aspects of this disclosure. In some embodiments, the various blocks shown in FIG. 3 may be included in, associated with, or implemented in accordance with one or more of the components and devices described above in connection with FIGS. 1-2.

A source 302 may generate or otherwise transmit data. The data may be indicative of one or more content items, such as audio content, voice (e.g., VOIP), video content, graphics, pictures, text, emails, instant messages, etc. In some embodiments, source 302 may be associated with central office 103 or servers 105-107 of FIG. 1. In some embodiments, source 302 may include one or more VOD servers configured to deliver video using IPv4.

A network 308 may include one or more communication or data access networks. In some embodiments, network 308 may adhere to a first communication type, such as IPv4 communications. Network 308 may convey data received from source 302, or data generated by network 308, to one or more devices as described further below. In some embodiments, network 308 may be associated with network 109 of FIG. 1 or network 210 of FIG. 2.

A computing device such as a router 314, such as an Address Family Transition Router (AFTR), may function as a proxy to deliver one or more messages, such as an Internet Group Management Protocol (IGMP) message, to one or more devices, such as one or more routers. For example, router 314 may deliver a message from users behind an element 326 to a first-hop IPv4 multicast router upstream of router 314. In some embodiments, router 314 and/or element 326 may be associated with central office 103 or interface 120 of FIG. 1. In some embodiments, element 326 may comprise a broadband element, such as a Basic Bridging BroadBand element (B4).

In some embodiments, router 314 may be included as a bridge to join both IPv4 and IPv6 multicast (or another transmission scheme) distribution trees. For example, router 314 may replicate IPv4 multicast streams into IPv4-in-IPv6 streams in one or more branches of an IPV6 multicast distribution stream. In some embodiments, router 314 may build or reference a translation tool, such as a mapping table, that maps element 326's IPV6 addresses and multicast groups. The table may function as an access table to, for example, match a multicast enrollment or subscription to element 326.

In some embodiments, router 314 may function to translate an IPV4 multicast address to an IPV6 multicast address and use join messages (e.g. PIM-JOIN) to join both the IPv4 and IPv6 multicast (or another transmission scheme) distribution trees. For example, router 314 may take the IPV6 multicast address from the PIM message sent by a router in network 320 and translate the IPV6 multicast address to the IPV4 multicast address. Router 314 may use the IPV4 multicast address to send the PIM message to a next-hop router in network 308.

A network 320 may include one or more communication or data access networks. In some embodiments, network 320 may adhere to a second communication type, such as IPv6 communications. In some embodiments, network 320 may be associated with network 109 of FIG. 1 or network 210 of FIG. 2.

In some embodiments, element 326 may be included in (e.g., embedded in), or otherwise associated with, a client device, such as a user or client device 332. In some embodiments, element 326 may enforce an Internet Group Management Protocol-Multicast Listener Discovery (IGMP-MLD) interworking function together with a de-capsulation function of received multicast IPv4-in-IPv6 packets. For example, element 326 may perform a listener portion of an Internet Group Management Protocol (IGMP) and a host portion of a Multicast Listener Discovery (MLD) protocol on an upstream interface. As a skilled artisan would appreciate, IGMP may be used in connection with IPv4 groups (e.g., multicast groups) and MLD may be used in connection with IPv6 groups (e.g., multicast groups). IGMP and MLD may be used between end systems to request or otherwise communicate data.

User device 332 may include one or more components for communicating with one or more devices, such as source 302. For example, in some embodiments user device 332 may be within a service node or group, such as a logical service group, associated with source 302. In some embodiments, client device may adhere to one or more communication types. For example, user device 332 may communicate according to IPv6. In some embodiments, user device 332 may be associated with devices 112-117 of FIG. 1 or device 200 of FIG. 2. In some embodiments, user device 332 may include an IP-TV set-top box configured to receive a multicast stream from source 302 in IPv4.

The architecture of FIG. 3 is illustrative. In some embodiments, other architectures or variations of the architecture shown in FIG. 3 may be used. The various blocks of FIG. 3 may be arranged in any way, and any number of communication paths may exist between or amongst the various blocks. By way of illustration, the dashed lines in FIG. 3 may represent alternative communication paths between source 302 and router 314, network 320, element 326, and/or user device 332. Thus, using one or more of the dashed communication paths, source 302 may communicate with one or more of router 314, network 320, element 326, and/or user device, potentially bypassing network 308. Other communication paths (not shown in FIG. 3) may be used by one or more of the blocks shown in FIG. 3.

Figure 4:
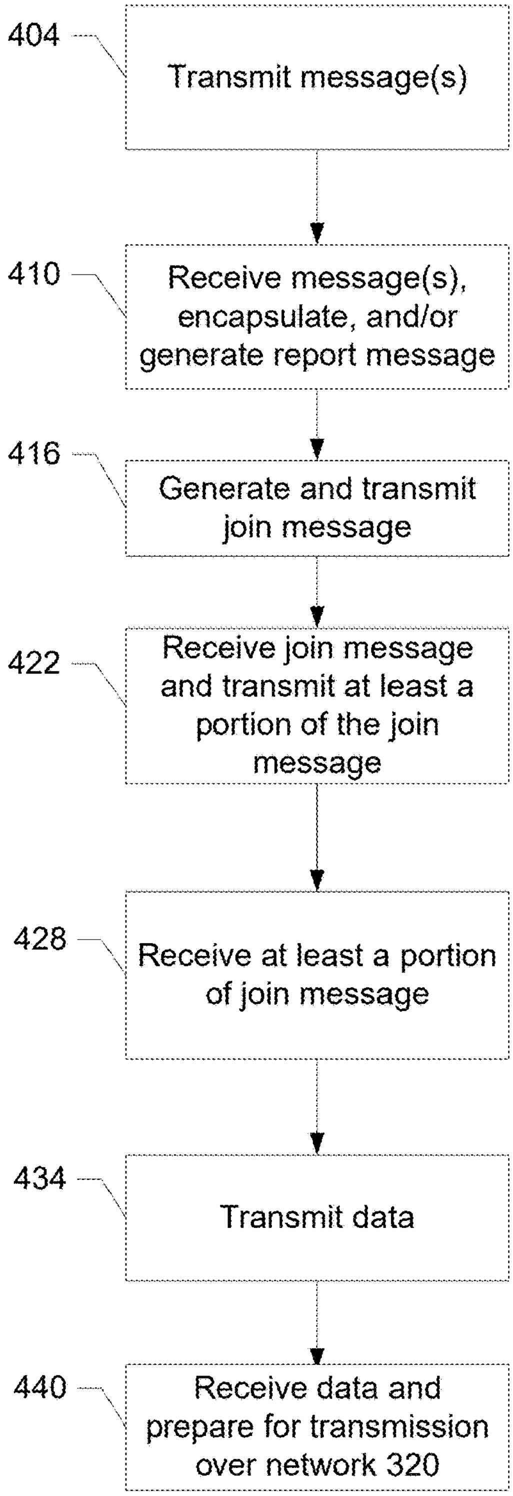
FIG. 4 illustrates a method demonstrating one or more aspects of this disclosure.

FIG. 4 illustrates a method that may be used in conjunction with one or more aspects of this disclosure. The method of FIG. 4 may be operative in connection with one or more architectures or environments. The method of FIG. 4 is described below in connection with the architecture of FIG. 3 for illustrative purposes only. The method may be adapted to accommodate other environments or architectures.

The method of FIG. 4 may be used as a proxy for encapsulating IPv4 packets or traffic into IPv6 packets or traffic, or vice versa. For example, a device (e.g., device 332 of FIG. 3) behind an element or device (e.g., element 326 of FIG. 3) may only have an IPV6 address (as opposed to an IPv4 address) associated with it, potentially due to a lack of available IPv4 addresses or other reasons. The method of FIG. 4 may be used to realize an expansion of a network address space (e.g., IPv4 to IPv6 compliant communication) without having to fully implement a more advanced communication type (e.g., IPv6).

In step 404, user device 332 may transmit one or more messages. The one or more messages may be indicative of a request for service, such as a request for a content item or asset. The one or more messages may be transmitted in response to a user device 332 indicating that the user wants to join or subscribe to a group, such as an IPv4 multicast group. The one or more messages may comprise an IGMP message. The one or more messages may be generated by device 332. The one or more messages may comprise one or more control messages.

In step 410, a network device such as element 326 may receive one or more messages, such as a message transmitted by user device 332, in connection with step 404. Element 326 may encapsulate the one or more messages with a header, such as an IPV6 header. Element 326 may convert one or more messages into a report message, such as an MLD report message. Element 326 may transmit the MLD report message upstream, e.g., towards source 302.

In step 416, a join message may be triggered or generated. For example, a join message (e.g., a PIM-JOIN) may be triggered by an MLD querier or another entity (not shown in FIG. 3) in response to receiving the MLD report message. In some embodiments, the join message may be indicative of a communication type, such as IPv6. The join message may be transmitted to one or more devices or entities.

In step 422, the join message of step 416 may be received by one or more entities. For example, the join message may be received by a computing device, such as a router 314. Router 314 may extract a group address (e.g., an IPv4 multicast group address) from the join message and may transmit the join message, or a portion thereof, upstream, e.g., toward source 302. In this regard, communications between router 314 and devices upstream from router 314 (e.g., source 302) may adhere to a first communication type (e.g., IPv4), and communications between router 314 and devices downstream from router 314 (e.g., user device 332) may adhere to a second communication type (e.g., IPv6).

In step 428, source 302 (or another entity not shown in FIG. 3) may receive the join message, or a portion thereof, transmitted in connection with step 422. In response to the message, source 302 (or another entity) may provide service to user device 332. For example, as part of step 428, source 302 (or another entity) may enroll user device 332 in a service group, provide or transmit a content item or asset, etc.

In step 434, source 302 may transmit data to router 314. The data may be transmitted in response to the (portion of the) join message received in connection with step 428. The transmitted data may fulfill a service request initiated by user device 332 (e.g., where the service request may be indicated by one or more of the messages transmitted in connection with step 404).

In step 440, router 314 may receive the data transmitted in connection with step 434 and may prepare the data for transmission over network 320, where network 320 may adhere to IPv6 communications.

In some embodiments, as part of step 440, router 314 may associate one or more tunnel interfaces, such as logical tunnel interfaces, to create a multicast tunnel or channel, or a unicast tunnel or channel, or another type of communication/transmission path. One or more devices may encapsulate data packets according to a first communication type (e.g., IPv4) into packets of a second communication type (e.g., IPv6). One or more devices may transmit the encapsulated data packets according to the second communication type to one or more other devices, such as a downstream multicast enabled router configured in accordance with the second communication type, via the tunnel.

In some embodiments, data received at router 314 from an upstream device (e.g., source 302) may include an indication of the tunnel itself or an intended destination (e.g., user device 332, or an address of user device 332). Responsive to receiving data with such an indication, router 314 may convert such data to a particular communication type (e.g., IPv6) and transmit the data to the destination device(s) in that form. Router 314 may maintain a table in memory to facilitate mapping a destination device to one or more tunnels or channels. For example, router 314 may maintain a mapping of an address associated with a destination device to one or more tunnels or channels.

The method of FIG. 4 is illustrative. In some embodiments, some of the steps (or portions thereof) may execute in an order different from what is shown. In some embodiments, some of the steps (or portions thereof) may be optional. In some embodiments, one or more additional steps not shown may be included.

While some examples have been described above in the context of Internet Protocol (IP) technology and communications, aspects of this disclosure may readily be applied to other forms and types of communication. The various forms of communication may be operative in connection with one or more television networks, computer networks, satellite networks, cellular networks, etc., in any potential combination.

Although not required, various aspects described herein may be embodied as a method, a system, an apparatus, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware, and/or hardware. The functionality may be resident in a single computing device or application, or may be distributed across multiple computing devices/platforms or applications, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The methods and processes described herein may be tied to particular machines or apparatuses. For example, as described herein, a router may interface communications between two or more entities using two or more communication types. More generally, one or more apparatuses may include one or more processors and memory storing instructions that, when executed by the one or more processors, cause the one or more apparatuses to perform the methodological acts and processes described herein. Furthermore, the methodological acts and processes described herein may perform a variety of functions including transforming an article (e.g., messages and/or data in accordance with a first communication type) into a different state or thing (e.g., messages and/or data in accordance with a second communication type).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

The invention claimed is:

1. A method comprising:

receiving, by a computing device and from a client device of a plurality of client devices, a message that complies with a first communication protocol;

sending, to a source associated with a multicast group, a version of the message that complies with a second communication protocol of the multicast group;

receiving, after sending the version of the message that complies with the second communication protocol, a response that indicates a communication path to the client device; and sending, to the client device via the communication path, a version of the response that complies with the first communication protocol.

2. The method of claim 1, wherein the first communication protocol comprises a first version of Internet Protocol, and wherein the second communication protocol comprises a second version of Internet Protocol.

3. The method of claim 1, further comprising:

based on receiving a second message that complies with the first communication protocol and is indicative of a request by the client device to join a second multicast group, sending, to a source associated with the second multicast group, a version of the second message that complies with the second communication protocol; and based on receiving a second response complying with the second communication protocol, sending, to the client device, a version of the second response that complies with the first communication protocol.

4. The method of claim 1, further comprising:

encapsulating the message with a header associated with the second communication protocol to generate the version of the message.

5. The method of claim 1, wherein receiving the message comprises receiving the message via the communication path.

6. The method of claim 1, wherein the communication path comprises a local tunnel between the computing device and the client device.

7. An apparatus comprising:

one or more processors; and memory storing instructions that, when executed by the one or more processors, cause the apparatus to:

receive, from a client device of a plurality of client devices, a message that complies with a first communication protocol;

send, to a source associated with a multicast group, a version of the message that complies with a second communication protocol of the multicast group;

receive, after sending the version of the message that complies with the second communication protocol, a response that indicates a communication path to the client device; and send, to the client device via the communication path, a version of the response that complies with the first communication protocol.

8. The apparatus of claim 7, wherein the first communication protocol comprises a first version of Internet Protocol, and wherein the second communication protocol comprises a second version of Internet Protocol.

9. The apparatus of claim 7, wherein the instructions, when executed by the one or more processors, cause the apparatus to:

based on receiving a second message that complies with the first communication protocol and is indicative of a request by the client device to join a second multicast group, send, to a source associated with the second multicast group, a version of the second message that complies with the second communication protocol; and based on receiving a second response complying with the second communication protocol, send, to the client device, a version of the second response that complies with the first communication protocol.

10. The apparatus of claim 7, wherein the instructions, when executed by the one or more processors, cause the apparatus to:

encapsulate the message with a header associated with the second communication protocol to generate the version of the message.

11. The apparatus of claim 7, wherein the instructions, when executed by the one or more processors, cause the apparatus to receive the message by receiving the message via the communication path.

12. The apparatus of claim 7, wherein the communication path comprises a local tunnel between the apparatus and the client device.

13. A system comprising:

a computing device and a client device;

wherein the computing device is configured to:

receive, from the client device, a message that complies with a first communication protocol;

send, to a source associated with a multicast group, a version of the message that complies with a second communication protocol of the multicast group;

receive, after sending the version of the message that complies with the second communication protocol, a response that indicates a communication path to the client device; and send, to the client device via the communication path, a version of the response that complies with the first communication protocol; and wherein the client device is configured to:

send the message; and receive the version of the response.

14. The system of claim 13, wherein the first communication protocol comprises a first version of Internet Protocol, and wherein the second communication protocol comprises a second version of Internet Protocol.

15. The system of claim 13, wherein the computing device is configured to:

based on receiving a second message that complies with the first communication protocol and is indicative of a request by the client device to join a second multicast group, send, to a source associated with the second multicast group, a version of the second message that complies with the second communication protocol; and based on receiving a second response complying with the second communication protocol, send, to the client device, a version of the second response that complies with the first communication protocol.

16. The system of claim 13, wherein the computing device is configured to:

encapsulate the message with a header associated with the second communication protocol to generate the version of the message.

17. The system of claim 13, wherein the computing device is configured to receive the message by receiving the message via the communication path.

* * * * *